(12) United States Patent
Böhler et al.

(10) Patent No.: US 12,706,489 B2
(45) Date of Patent: Aug. 11, 2026

(54) OBJECT DETECTION APPARATUS FOR AN INDUCTIVE CHARGING SYSTEM

(71) Applicant: BRUSA Elektronik AG, Sennwald (CH)

(72) Inventors: Lukas Böhler, Sennwald (CH); Paolo Lombardo, Sennwald (CH)

(73) Assignee: BRUSA ELEKTRONIK AG, Buchs (CH)

( * ) Notice: Subject to any disclaimer, the term of this patent is extended or adjusted under 35 U.S.C. 154(b) by 1006 days.

(21) Appl. No.: 17/785,588

(22) PCT Filed: Dec. 14, 2020

(86) PCT No.: PCT/EP2020/085925
§ 371 (c)(1),
(2) Date: Jun. 15, 2022

(87) PCT Pub. No.: WO2021/122427
PCT Pub. Date: Jun. 24, 2021

(65) Prior Publication Data

US 2023/0027715 A1 Jan. 26, 2023

(30) Foreign Application Priority Data

Dec. 19, 2019 (EP) .................................... 19217936

(51) Int. Cl.
*H02J 50/60* (2016.01)
*B60L 53/124* (2019.01)
(Continued)

(52) U.S. Cl.
CPC ............ *H02J 50/60* (2016.02); *B60L 53/124* (2019.02); *G01S 13/003* (2013.01); *G01S 13/04* (2013.01); *H02J 50/10* (2016.02); *H02J 50/80* (2016.02)

(58) Field of Classification Search
CPC ...................................................... H02J 50/60
(Continued)

(56) References Cited

U.S. PATENT DOCUMENTS

2015/0260835 A1* 9/2015 Widmer ................ B60L 53/124 342/27
2015/0355360 A1 12/2015 Miyashita
(Continued)

FOREIGN PATENT DOCUMENTS

WO WO 2016/060748 A1 4/2016
WO WO 2018/210427 A1 11/2018
WO WO 2019/086690 A1 5/2019

OTHER PUBLICATIONS

International Search Report issued in International Application No. PCT/EP2020/085925 on Feb. 8, 2021.
(Continued)

*Primary Examiner* — Ahmed H Omar
(74) *Attorney, Agent, or Firm* — Hoffmann & Baron, LLP

(57) ABSTRACT

In an inductive charging system energy is transferred via a magnetic field. An object detection apparatus for an inductive charging system comprises: a transmitter configured to transmit a signal; a receiver having a field of view including a substantial portion of the magnetic field, the receiver configured to receive within the field of view a reflected signal of the signal; and a signal processor configured to examine characteristics of the received, reflected signal to identify a hazard condition in relation to the magnetic field. By converting the received signal into a frequency domain signal, hazard conditions may be identified depending on the form of the frequency domain signal. The object detection apparatus is suitable for use in a charging apparatus for an electric vehicle.

24 Claims, 5 Drawing Sheets

(51) Int. Cl.

| | |
|---|---|
| ***G01S 13/00*** | (2006.01) |
| ***G01S 13/04*** | (2006.01) |
| ***H02J 50/10*** | (2016.01) |
| ***H02J 50/80*** | (2016.01) |

(58) Field of Classification Search

USPC .......................................................... 320/108

See application file for complete search history.

(56) References Cited

U.S. PATENT DOCUMENTS

| | | | | |
|---|---|---|---|---|
| 2016/0039411 | A1* | 2/2016 | Park | G01S 13/931 701/70 |
| 2016/0109564 | A1 | 4/2016 | Sieber et al. | |
| 2016/0187520 | A1 | 6/2016 | Widmer et al. | |
| 2017/0080962 | A1* | 3/2017 | Kashima | B61L 23/041 |
| 2017/0290011 | A1 | 10/2017 | Kushnir et al. | |
| 2018/0313970 | A1 | 11/2018 | Widmer et al. | |
| 2020/0187126 | A1* | 6/2020 | Bolin | H04B 7/0695 |
| 2020/0272165 | A1* | 8/2020 | Ran | G05D 1/0061 |
| 2022/0392334 | A1* | 12/2022 | Kim | G01S 13/886 |

OTHER PUBLICATIONS

Written Opinion of the International Searching Authority issued in International Application No. PCT/EP2020/085925 on Feb. 8, 2021.

* cited by examiner

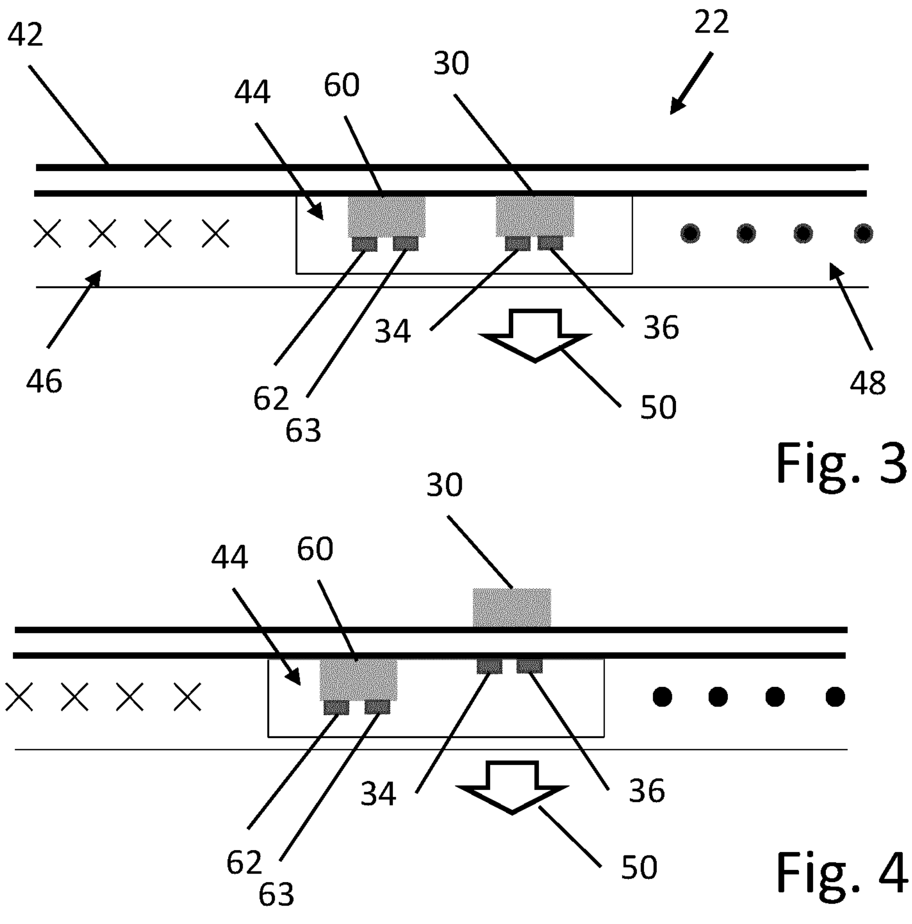
42
22
44
60
30
46
62
63
34
36
50
48
Fig. 3
30
44
60
62
63
34
36
50
Fig. 4
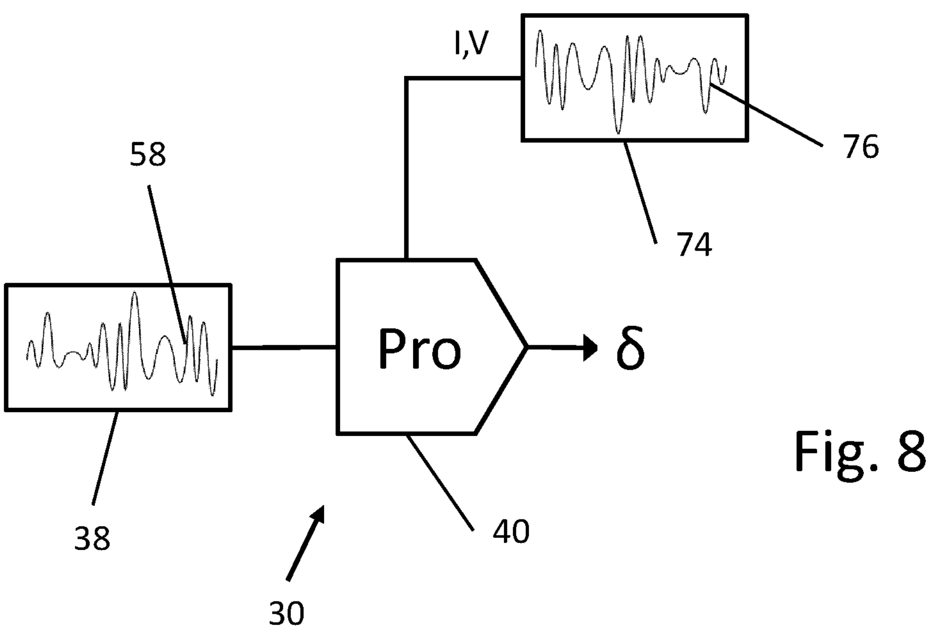
I,V
76
74
58
Pro
δ
38
40
30
Fig. 8

OBJECT DETECTION APPARATUS FOR AN INDUCTIVE CHARGING SYSTEM

CROSS-REFERENCE TO RELATED APPLICATIONS

The present application is the U.S. National Phase of PCT/EP2020/085925, filed on 14 Dec. 2020, which claims priority to European Patent Application No. EP 19217936.4, filed on 19 Dec. 2019, the entire contents of which are incorporated herein by reference.

BACKGROUND

Field

An object detection apparatus for an inductive charging system. An inductive charging system comprising an object detection apparatus. A method of detecting a hazard condition in an object detection apparatus.

Related Art

Wireless power transfer techniques are increasingly being used to transfer power from electrical power sources to a wide range of devices from small hand-held consumer electronics devices such as mobile phones and tablets requiring a few watts of power to electric vehicles requiring kilowatts of power. In addition to the convenience of not having to plug in a device to power it or recharge its batteries, the absence of wires and cables makes for tidier desks and parking spaces, while reducing clutter, trip and shock hazards. There are several ways in which power may be transferred wirelessly, including capacitive coupling and inductive coupling, both of which offer advantages over resistive (i.e., wired) coupling for the purpose of supplying power to a device.

Wireless power transfer systems can be designed to deliver anything from fractions of a watt, a few watts to many kilowatts from a power source across a gap to a device or load. Typically, the gap is an air gap between magnetic coils, although other techniques include the delivery of power between plates of a capacitor. And they can be designed to operate at fixed or variable frequencies which can be useful for varying load conditions.

The energy thus delivered may be used, for example, to power an electronics circuit, to power a device. This includes powering a consumer device such as a cell phone or table. It also includes driving an electric motor in an electric vehicle and charging batteries in the circuit or vehicle. Powering a cell phone or charging its battery requires a few watts, whereas powering the motor in an electric vehicle or charging the battery requires several kilowatts. The larger the battery circuit or motor, or the faster the battery is required to charge, the greater the power that must be transferred across the air gap.

Wireless power transfer techniques have developed in different fields of technology which has resulted in different terms being used to describe essentially the same thing. Such terms as 'magnetic coupling,' 'magnetic induction,' 'inductive power transfer,' 'inductive charging' and 'resonant inductive power transfer' are common. Although there may be minor differences, these terms are generally used broadly and interchangeably to refer to systems that transfer power from a source across an air gap to a load by way of a magnetic field. The term 'inductive charging system' or ICS will be used herein to identify this kind of system.

In a similar vein, various terms are used to refer to different elements of an inductive charging system (ICS). Essentially an ICS comprises equipment associated with the power supply and equipment associated with the device. The power supply equipment comprise circuitry that converts energy from the power supply into a form suitable for driving a coil. Similarly, the device equipment converts energy induced in a coil by the magnetic field into a form suitable for powering the device or charging batteries in the device.

Inductive charging systems can be used to charge batteries in electric vehicles. Drivers can park their cars over charging equipment on the ground, which couples magnetically with a charging equipment on the vehicle to transfer energy to the battery. Inductive charging systems for vehicles similarly have several different names. For example, they are also known as wireless electric vehicle charging (WEVC) systems and electric vehicle battery chargers. There is no particular significance in the names, they are simply a matter of commercial choice.

In an inductive charging system (ICS) for use with electric vehicles the power supply equipment has various names including ground pad and ground pad module (GPM) which is connectable to a main power supply. The device equipment is known as the vehicle pad or the car pad module (CPM) and is mountable in a vehicle such as a car to provide energy to charge the vehicle's battery. The naming in many situations depends on what language is adopted by a given manufacturing company. Naturally, an electric vehicle ICS is capable of working with diverse vehicles, including cars and heavier road vehicles, including trucks, buses and trams, and is not limited to use with cars, be they road-going or otherwise. The terms 'ground pad module' (GPM) and 'car pad module' (CPM) will be used herein to identify the two main parts of an ICS for electric vehicles.

Other terms that vary between different implementations of an ICS include 'magnetic coils', 'induction coils' and 'antennas.' These terms too are used loosely and essentially interchangeably to describe the parts of an inductive charging system that transfer energy across the air gap. Although nothing should turn on the use of these different terms, it is worth noting for the sake of accuracy that the elements are actually coils rather than antennas. This is because at typical operating frequencies the elements transfer energy in the near field where only the magnetic field is present.

Antennas are designed with the electromagnetic field in mind, which forms once the radiated energy passes from beyond the near field to the far field. Where the near field ends and the far field begins depends on characteristics of the transmitting device (e.g., coil or antenna). For wireless power transfer applications an exact definition is usually unnecessary because the size of the air gap and the frequencies that the system operates places it firmly in the near field. Nevertheless, the aforementioned 'magnetic coils,' 'induction coils' and 'antennas' are similarly used interchangeably by those active in the art of wireless power transfer.

Inductive charging systems may use magnetic coils either alone or coupled with other tuned or tuneable elements. In electric vehicle power transfer applications, a ground pad module may contain a coil in combination with associated driving electronics or it may contain the coil with some or all the associated electronics being provided in a separate enclosure. Either way, the coil in the ground pad module is used to transmit power via a magnetic field. Similarly, a car pad module may contain a coil in combination with associated control electronics or it may contain the coil with some or all the associated electronics being provided in a separate enclosure. Either way, the coil in the car pad module is used to receive power via a magnetic field.

One area of focus in the design of inductive charging systems is maintenance of a safe environment. When the system is operational, the magnetic field can transfer large amounts of energy across the space between the ground pad module and the vehicle pad module. Even a small domestic system in use generates a magnetic field capable of transferring 2 to 3 kW of energy between the pads. Foreign objects such as coins, paper clips and even foil-capped yoghurt pots will heat up in the magnetic field creating a fire hazard. Living objects, i.e., people and animals, risk injury if exposed to such a high energy magnetic field.

With this in mind, effort has been put into designing inductive charging systems that are able to detect an object or objects in or entering the magnetic field. Inductive charging systems commonly include an object detection apparatus that identifies such objects and causes the system to shut down until the object moves or is removed from the field.

WO2016060748 appears to describe an apparatus for living object protection in which a plurality of radar modules is used to detect objects in a detection area. The radar modules are mounted on the sides of the base pad directed away from the base pad to provide coverage on all sides of the base pad.

WO2019086690 appears to describe a monitoring device of an inductive energy transmission unit. The monitoring system evaluates Doppler information and compensates that information with stored Doppler signatures stored in the monitoring device.

SUMMARY

In an inductive charging system energy is transferred via a magnetic field. An object detection apparatus for an inductive charging system comprises a transmitter for transmitting a signal and a receiver having a field of view including a substantial portion of the magnetic field for receiving reflections of the signal within the field of view. A signal processor examines characteristics of the received signal to identify a hazard condition in relation to the magnetic field. By converting the received signal into a frequency domain signal hazard conditions may be identified depending on the form of the frequency domain signal. The object detection apparatus is suitable for use in a charging apparatus for electric vehicle.

As defined in the claims, the invention provides an object detection apparatus for an inductive charging system, an inductive charging system comprising an object detection apparatus and a method of detecting a hazard condition in an object detection apparatus.

The invention and features thereof are set forth with particularity in the claims and together with advantages thereof may become clearer to those possessed of the appropriate skill from consideration of the following detailed description given by way of example with reference to the accompanying drawings.

BRIEF DESCRIPTION OF THE DRAWINGS

In the drawings:

FIG. 3 is a schematic cross section of a car pad module;

FIG. 4 is a schematic cross section of another car pad module;

FIG. 8 is a schematic diagram showing further elements of the object detection apparatus;

FIGS. 9(*a*)-9(*c*) show graphical representations of frequency domain signals having (a) substantial symmetry, (b) right handedness, and (c) left handedness;

DETAILED DESCRIPTION

Figure 1:
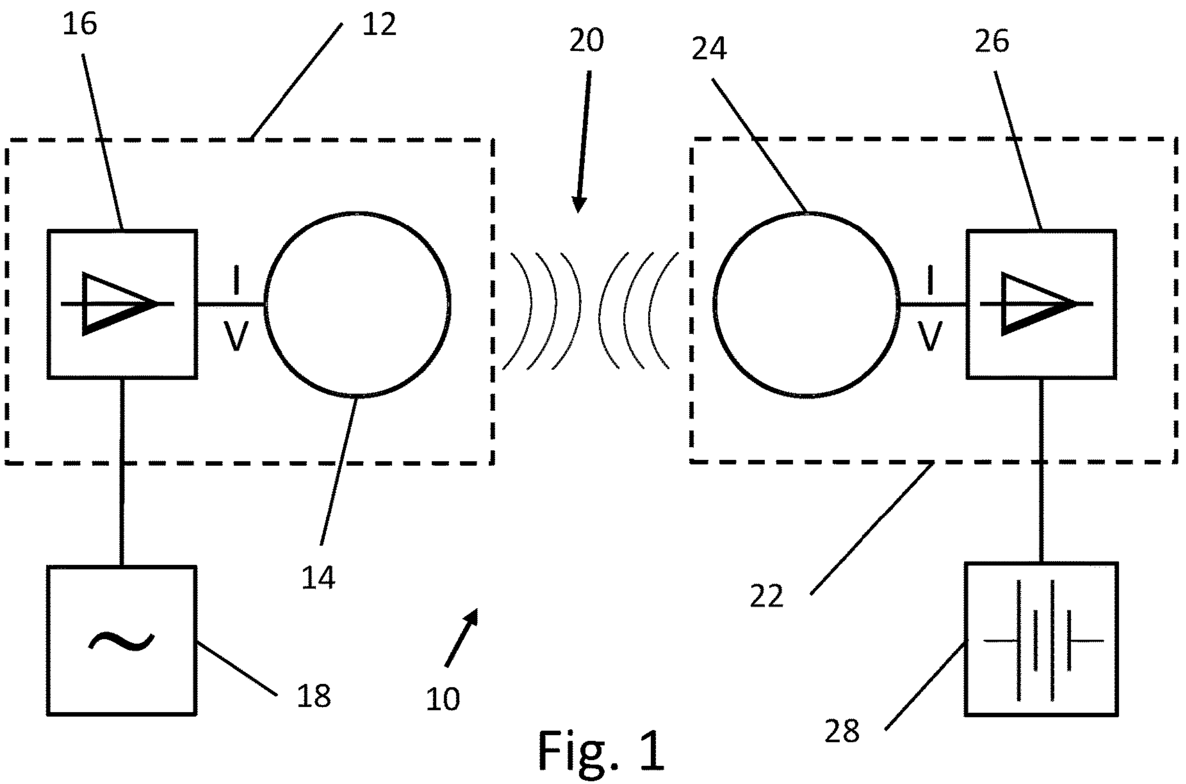
FIG. 1 is a schematic diagram showing elements of an inductive charging system for an electric vehicle.

Turning now to FIG. 1 of the accompanying drawings, an inductive charging system (ICS) 10 comprises a ground pad module (GPM) 12 containing a coil 14 and driving circuitry 16 couplable to an electrical power supply 18. Power signals from the supply 18 are conditioned by the driving circuitry 16 to put them in suitable form for application to the coil 14. The coil 12 is driven by this application of the power signals—represented as current I and voltage V—to generate a magnetic field 20.

The power supply 18 may be a domestic voltage supply at, e.g., 110*v* or 220*v*. Such domestic installations would be limited to 2-3 kW, meaning that the charging of a battery will typically take several hours. A larger power supply such as a poly-(plural) phase supply at 415 volts or higher enables charging to be completed more quickly. Larger powers—and therefore faster charging—may be provided in commercial or industrial implementations.

The size and form of the ground pad module 12 depends on the technical requirements of the system. The coil 14 is depicted as a circle in FIG. 1 but it could be any polygonal or elliptical shape. The coil 14 may be configured as a solenoid, arranged in a double-D configuration or any other of the widely available coil topologies. The exact form is determined by the technical requirements of the system and on routine design choices. To give an idea of size, the ground pad module 12 is typically around 600 mm in width. The height of the GPM 12 should be as low as possible to avoid the GPM causing a snagging hazard with the underside of a vehicle or a tripping hazard.

The inductive charging system 10 also comprises a car pad module (CPM) 22. In use, the CPM 22 is placed on a car (not shown) at a location determined by design considerations, e.g., under the chassis or floor pan. When the car is driven over the GPM 12 and the CPM 22 positioned thereover, energy can be transferred from the GPM to the CPM. The magnetic field 20 is converted by the coil 24 into power signals—represented as current I and voltage V—that are conditioned by driving circuitry 26 to put them in a form suitable to deliver energy to, and thus charge, a battery 28.

As with the ground pad module (GPM) 12, the size and form of the CPM 22 is governed by technical requirements and design choices made when designing the inductive charging system 10. The car pad module (CPM) 22 is similarly provided in a package. Again, the exact form of the coil 24 and thus the shape and size of the CPM 22 is determined in the most part by technical requirements and design choices. The coil 24 need not be circular as depicted and, indeed, it need not even have the same form or topology as the coil 14 in the ground equipment 12. Space in a vehicle is limited. The aim usually is to make the CPM 22 as small as possible, e.g., around 300 mm in width.

One convenience of an ICS 10 is that the battery 28 on a vehicle may be charged simply by parking the vehicle over the ground pad 12 in a position where the car pad module 22 and the ground pad module 12 are aligned. Vehicle guidance and alignment equipment (not shown) may be provided to assist the driver in correctly positioning the vehicle, and thus the car pad module 22, relative to the ground pad module 12.

Figure 2:
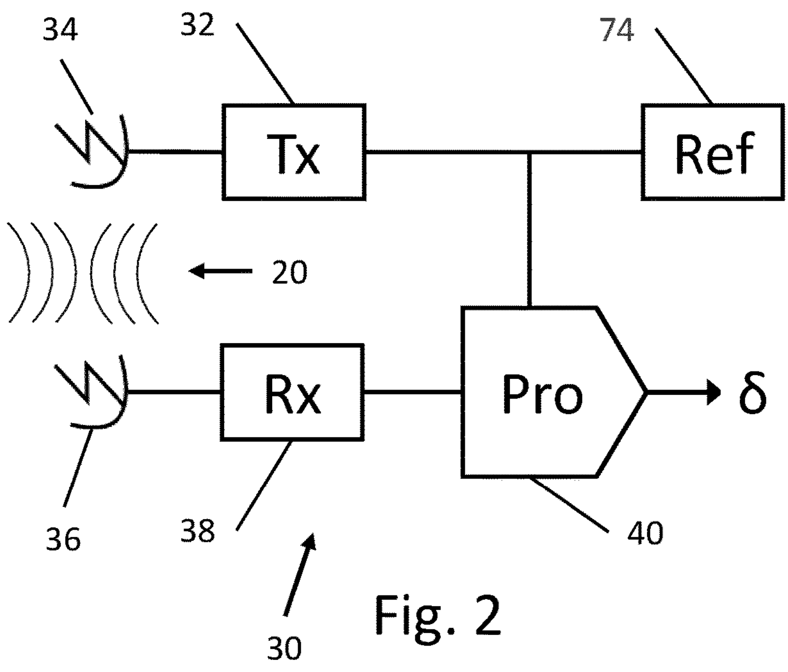
FIG. 2 is a schematic diagram showing elements of an object detection apparatus.

The inductive charging system 10 includes an object detection apparatus 30 which is illustrated in FIG. 2 of the accompanying drawings. The object detection apparatus 30 may be included in or alongside the ICS system 10 of FIG. 1. The object detection apparatus 30 comprises a transmitter 32 for transmitting a signal via an antenna 34, and an antenna 36 coupled to a receiver 38. The antennas 34, 36 are directed toward the volume of space between the coils 14, 24 of the GPM 12 and CPM 22. The receiving antenna 36 serves to receive reflections of the signal from transmitting antenna 34. The object detection thus uses a form of radar to detect objects in the magnetic field 20 in the volume between the car pad module (CPM) 22 and the ground pad module (GPM) 12.

Characteristics of the transmitted signal may be used as a reference. At the very least, a change in the signal received by the receiver 38 indicates a change in operating conditions. Typically, the presence of a reflection indicates the presence of an object. And a change in frequency indicates movement of an object, i.e., the doppler effect. The object detection apparatus 30 can, thus, be configured to detect movement of a vehicle caused, e.g., by passengers entering or leaving the vehicle or by a cat or other animal jumping onto the vehicle.

Such a change may indicate an unwanted or unexpected object in the magnetic field 20. The signals from the receiver 38 are passed to a signal processor 40 which processes characteristics of the received signal to determine what has caused the change. The processor outputs a corresponding signal 6 to which the ICS 10 responds by shutting down (or reducing to a safe level) the magnetic field 20 until the hazard has passed.

The antennas 34, 36—as with all antennas—have a radiation pattern including a beamwidth that may be regarded as the field of view of the antenna. For any given antenna the radiation pattern applies to both the transmission and reception of signals. The object detection apparatus 30 is placed in or near the car pad module (CPM) 22 or the ground pad module (GPM) 12.

The exact relationship between the magnetic field 20 and the fields of view (i.e., beamwidths) of the antennas will depend on the specific design of the ICS 10. The ground and car pads 12, 22 are so designed that the magnetic field 20 is as much as possible contained within the volume of space between the GPM and the CPM. The field of view of the object detection antennas 34, 36 should be chosen and the antennas so placed that any objects in the magnetic field will be 'seen' by the antennas.

In practice there will be leakage of the field beyond the volume of space between the GPM and the CPM. To the extent that the magnetic field 20 exceeds specified safety levels in regions outside that volume, the field of view of the antennas 34, 36 should include those regions too. Typically, the antennas 34, 36 are placed alongside each other or are provided as a single antenna that is shared between the transmitter 32 and the receiver 38.

Radar devices are widely available as off-the-shelf units. Thus, although shown as separate elements, the antennas 34 and 36, the transmitter 32 and receiver 38, and the processor 40 or various sub-combinations thereof may be provided as a single off-the-shelf unit. The two antennas 34 and 36 may be combined in a single antenna or single unit. Reflections of the signals transmitted from antenna 34 are received by antenna 36 and the receiver 38. The received signals are analysed by the signal processor 40 to detect the presence of an object in the magnetic field 20.

Current thinking in the design of inductive charging systems is to place the object detection apparatus in or on the ground equipment. In order to ensure that the object detection apparatus can 'see' objects at positions where a hazard could occur, plural sensors (e.g., radar modules) are placed at the periphery of the base pad. See for example the above mentioned WO2016060748.

In the ICS 10, the object detection apparatus 30 is preferably, but not essentially, placed in the car pad module (CPM) 22. As a practical matter it will usually be more straightforward to place the radar module in or alongside the CPM 22. There the antennas can in use 'look' down toward the ground pad 12 and 'see' the volume occupied by the magnetic field and beyond. Placing the antennas centrally in the CPM 22 will usually be the optimal approach.

A single unit (e.g., radar module) is preferably but not essentially used, which is more cost effective. Careful selection at the design stage of a signal antenna or a transmit-receive antenna pair enables a comprehensive field of view—including the space between the ground pad module and the car pad module containing the magnetic field and other regions beyond that volume where the field may be a risk—without adding significant weight or volume to the car pad module.

Turning now to the schematic cross section of the car pad module 22 in FIG. 3, the CPM 22 comprises a printed circuit board (PCB) 42 or other support. Mounted to this support is the coil driving circuitry 26 and other electrical and electronic elements associated with the operation of the pad 22. This includes the object detection apparatus 30 and its antennas 34, 36. The object detection apparatus 30 is mounted in a space 44 bounded by turns 46 and 48 of the coil 24. The crosses and dots here simply represent cross sections of the coil turns with current in use conceptually flowing in a direction into (cross) or out of (dot) the page.

The field of view of the antennas 34, 36 is away from the PCB 42 in the direction represented by arrow 50. When the car pad module (CPM) 22 is installed under a car the direction of the arrow 50 corresponds to a direction away from the car and toward the GPM (not shown in FIG. 3). The combination of placing the antennas 34, 36 in the CPM 22 and selecting antennas with suitable radiation patterns enables the object detection apparatus to 'see,' i.e., detect, objects in the magnetic field 20 between the GPM 12 and the CPM 22.

As shown in FIG. 4 of the drawings, in another car pad module 22, the circuitry associated with the object detection apparatus 30 is placed above (i.e., in use placed on the vehicle side) the printed circuit board (PCB 42). The antennas 34, 36 are on the underside (as shown and in use) of the PCB again 'looking' in the direction of the arrow 50 down toward the ground pad (not shown).

It will be appreciated from consideration of FIGS. 3 and 4 and the foregoing description that the placement of the detection apparatus circuitry and antennas is a matter of design choice driven by technical requirements.

Currently inductive charging systems are being supplied as complete systems—ground pad module and car pad module together—to customers. This may change as inductive charging systems become more established. Car manufacturing companies may decide that they only wish to supply their cars with the car pad module; ground pads will be supplied by separate companies. Car companies may then specify that the car pad modules should be as light and cheap as possible. This would drive a move of ICS elements from the car pad to the ground pad.

For at least these design-driven reasons it may be necessary in some inductive charging systems to place the object detection apparatus 30 at or in the ground pad 12. Where this is done, the antennas 34, 36 would typically be placed below the upper surface of the ground pad 12 centrally therein. The antennas would 'look' up through the ground pad 12 toward the vehicle pad 22. It is desirable and may even be necessary to be able to see objects on the surface of the ground pad 12. This would require an antenna radiation pattern that is essentially omnidirectional, at least within a hemisphere above the surface of the ground pad.

Similarly, although desirable in the interest of weight and occupied space, it may necessary in some systems to use more than one antenna for transmission or reception or both of the object detection signals. The layout of a given vehicle might contain 'blind spot,' i.e., areas or spaces under the vehicle that are obscured from a single position that is otherwise optimal for the location of the object detection antenna. A second antenna for transmission and/or reception may be an adequate solution under the circumstances.

Inductive charging systems include control equipment that enables data to be transferred between the ground pad module 12 and the car pad module 22 to control operation of the system 10. The control equipment includes a wireless link, usually compliant with an existing standard or combination of standards such as Wi-Fi or Bluetooth. FIGS. 3 and 4 both show a Wi-Fi unit 60 placed in the space 44 with the object detection apparatus 30. The Wi-Fi unit 60 has its own antennas 62, 63 for transmitting or receiving signals from a similar Wi-Fi unit in the ground pad (not shown).

Figures 5, 6, 7:
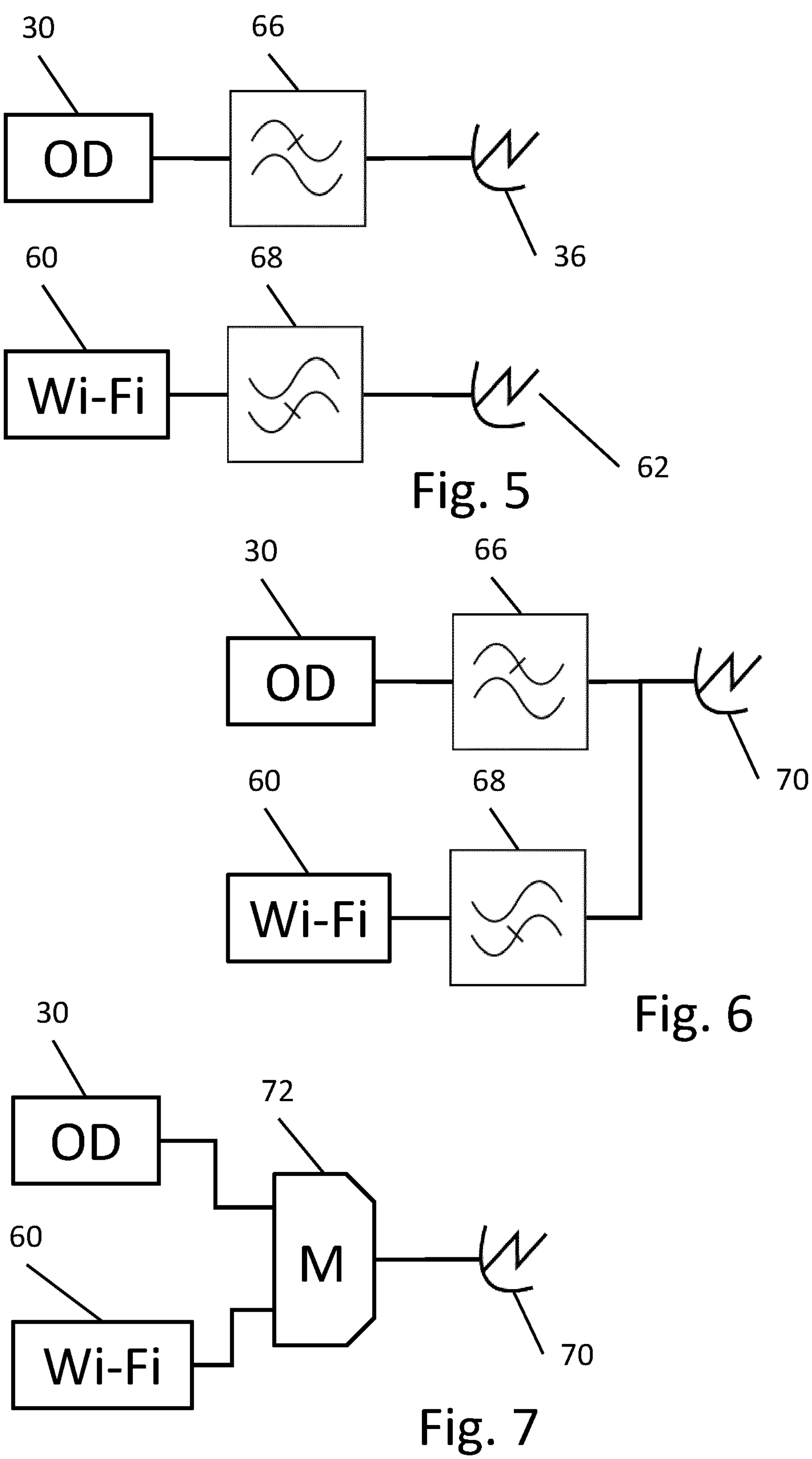
FIG. 5 shows elements of the charging system.
FIG. 6 shows the elements sharing via filters a common antenna.
FIG. 7 shows the elements sharing via a multiplexer a common antenna.

There are numerous ways in which the Wi-Fi and the object detection apparatus can be installed in the pads of an ICS. One approach is illustrated in FIG. 5 and treats the object detection apparatus 30 and the Wi-Fi unit 60 as entirely separate elements each with their own antennas 36, 62. Although the object detection apparatus 30 operates in one frequency band and the wireless control link (Wi-Fi) 60 operates at a different frequency band, it may be necessary to add band pass filters 66, 68 to each of the object detection apparatus 30 and the Wi-Fi 60 to avoid interference from harmonics or other sources.

In this FIG. 5 arrangement, further antennas are required to enable the wireless link, which adds further weight and cost to the ICS 10. The arrangements in FIGS. 6 and 7 address this problem.

As shown in FIG. 6, a single antenna 70 may be shared between the object detection apparatus 30 and the Wi-Fi element 60. Each of the object detection (OD) apparatus 30 and the Wi-Fi element 60 has an associated filter 66, 68 that is coupled to the antenna. The filter 66 allows object detection signals to pass between the antenna 70 and the object detection apparatus while blocking signals from the control equipment 60. The filter 68 allows control signals to pass between the antenna 70 and the control equipment 60 while blocking the object detection signal.

Alternatively, as shown in FIG. 7, a multiplexer (M) 72 may be placed between the single antenna 70 and the OD apparatus 30 and the Wi-Fi element 60, enabling switched access to the antenna 70 at different times.

In an ideal world, differences between the signal transmitted from antenna 34 and received by antenna 36 in the object detection apparatus would clearly represent the presence of an object in the magnetic field. In practice, there are many different situations that can result in a difference in signals that was caused by external influences. If one were to focus too much on the side of safety, the resulting system would frequently go into a safe mode of operation where the magnetic field was either shut down or reduced to a safe level. False alarms would make the ICS unreliable in charging a battery within a reasonably expected period of time.

Plainly it would be desirable to be able to distinguish between the true presence of an object in the magnetic field and a false positive. One way of doing this is to hold a definition of signal differences that correspond—or may correspond—to known false positives.

Returning to FIG. 2, in the object detection apparatus 30, characteristics of the transmitted signal serve as a reference which is fed into the signal processor 40. This enables the object detection apparatus 30 to detect movement, i.e., intrusion of an object, including changes of position of the object, in its field of view. The transmitted signal itself or digital data representing characteristics of the transmitted signal are provided by the transmitter 32 to the signal processor 40. The receiver 38 similarly feeds either the signal or characteristics of the received signal to the signal processor 40. Where there is a difference in frequency and/or phase between the transmitted and received signals, the processor 40 identifies any such difference as an output 6.

The detection apparatus 30 of FIG. 2 includes a reference store 74 that is used to hold data representing operational characteristics associated with these external events. The operational characteristics may represent waveforms associated with changes caused by an external event.

Relevant parts of the detection apparatus are also shown in FIG. 8. The reference store 74 holds data representing a library of data representing characteristics of reference signals or waveforms 76. The characteristics of each reference signal—which may be in a time or frequency domain—correspond to the nature of a received signal under known operating conditions.

Thus, the reference store 74 can hold data representing different waveforms for different events. A human entering a car might cause a relatively low frequency, high amplitude waveform, whereas a cat jumping on the car may cause a short pulse waveform. The reference store 74 holds enough data to enable the processor 40 to identify several different external events.

When there is a short-term change caused by an external event, the processor 40 compares data representing the signal 58 from the receiver 38 with data in the reference store 74. The signals 58, 74 may not be identical, but they will be similar. The processor compares characteristics of the received signal 58 waveform with characteristics of a reference waveform 76. When there is a substantial equivalence between the received and reference waveforms the processor 40 outputs an indication delta ($\delta$) that there is no or little difference (e.g., $\delta=0$). Where there is a difference between the two waveforms, the processor 40 indicates the difference by outputting a value $\delta\neq0$.

It will be appreciated that in practice there will, naturally, be some differences in the signal from the receiver and the signal represented by data in the reference store 40. Those differences are attributable to different operating conditions and ambient noise. Consequently, the value of 6 is unlikely to be truly zero. But the value will be close enough to zero to enable substantial equality to be determined between the received signal and the represented signal.

In the interest of brevity an output value of δ=0 will be used herein, it being understood that this means sufficiently close to zero to indicate that the two signals are essentially the same. Similarly, the equation δ≠0 does not mean any value that is not zero. It refers to a value of delta (δ) that is substantially larger than zero to the extent that it indicates that there is no equality between the characteristics of the received signal waveform with characteristics of a reference waveform 76.

An output of δ=0 means that the change may be caused by a known activity, e.g., a foreign or living object entering the magnetic field. This value is thus an indication of an event, i.e., a true positive caused by a foreign or living object entering the magnetic field. The ICS 10 therefore needs to shut down the magnetic field 20, say by switching off or significantly reducing the voltage and current delivered to the coil 14 in the ground pad 12. An output of δ≠0 means that the change is not a known activity and is likely a false positive. No action need be taken by the ICS 10.

There are further measures that can be put in place to mitigate false positives. These measures may be used alone or in combination with each other and with the above described monitoring of energy transfer (operational) parameters. For the purpose of identifying false positives, signals can be characterized as movement or vibration/noise. Movement corresponds to an object in the field of view of the object detection apparatus 30. The magnetic field 20 should be shut down or at least reduced to a safe level when movement is detected.

Fast Fourier transforms (FFTs) convert signals in the time domain into corresponding signals in the frequency domain. An FFT conversion of a signal gives rise to a frequency domain signal that comprises positive frequency components (+f) and negative frequency components (−f), where f=frequency. The positive and negative frequency components are a consequence of the use by FFTs of complex numbers, which comprise real and imaginary components. Usually, the negative frequencies contain the same information as the positive frequencies and can be ignored.

An FFT conversion of a simple sinusoidal signal gives rise to a frequency domain signal that comprises a single positive frequency component at +f and single negative frequency component at −f. By way of comparison, a note played on a musical instrument is more complicated because it comprises the note itself and harmonics of the note. In addition to the frequency of the note itself, the FFT will generate multiple other components at the frequencies of the harmonics. The note in the frequency domain will have equal +f and −f elements either side of f=0.

FIG. 9(*a*) of the drawings shows a graph 90 representing a frequency domain signal comprising essentially symmetrical −f elements 91 and +f elements 92 either side of vertical line 94 at f=0. The FIG. 9(*a*) graph is presented solely for the purpose of illustration and does not correspond to any specific signal or event. But it is the kind of graph one would expect to see when a signal is received by the receiver 38 of the object detection apparatus 30. This contains information that the signal from the transmitter 32 has been reflected by something in the field of view of the detection apparatus 30. Processing of that signal may reveal more information about that thing, e.g., whether it is moving or static.

In some systems (e.g., communications and radar) information is transmitted in the time domain using complex signals. The complex components of these signals are known as the in-phase (I) and quadrature (Q) components. They can be used separately to transmit different information. Radar transceivers are available that are able to represent received signals in complex form. The complex form may be presented in rectangular notation with real and imaginary components already discussed herein. The complex signals may alternatively be presented in polar notation with magnitude and phase components.

The significance of this is that complex representation includes more information about the received signal, and thus the object, which can be used in the determination of false positives and true events. Transforming the received complex signal in the time domain into equivalent signal in the frequency domain by way of, say, an FFT enables that additional information to be extracted.

Where signals represented by complex numbers are converted into the frequency domain, they produce results that contain information about position or movement of the detected object. Positive frequencies can be considered to relate to an object moving toward the detector, i.e., toward the magnetic field, and negative frequencies imply an object moving away from the space between the GPM and the CPM, i.e., away from the field. Thus, when there is movement of the object being detected, the positive and negative frequency components will differ between one side and another of the line f=0. In other words, the signal in the frequency domain will exhibit (left or right) handedness or sidedness.

The FIG. 9(*a*) graph 90 previously discussed does not exhibit handedness or sidedness. The plots on each side of the vertical line (f=0) 94 are substantially similar, if not identical. The reflected signal is from a moving object. And if the signal is not new, it suggests that the reflection is from something static and may well be a false positive.

In contrast, FIGS. 9(*b*) and 9(*c*) show graphs 96 and 98 in the frequency domain that exhibit (b) right handedness and (c) left handedness. The terms 'left' and 'right' here are arbitrary, with 'right' being chosen because the plot in graph (b) peaks to the right of a vertical line 94 and 'left' because the plot in graph (c) peaks to the left of the line 94.

FIGS. 9(*b*) and 9(*c*) represent signals (b) and (c) of a form that would be caused by, say, an object moving (b) toward and (c) away from the apparatus 30. FIG. 9(*b*) might represent the signal caused by a person walking toward the car and FIG. 9(*c*) the signal as the person continues walking past and away from the car. Thus, the object may be a living human or animal, who, if they get too close to the car may be exposed to the magnetic field. This is potentially dangerous, and it is necessary to identify the signal as an event relating to a condition that is or may become hazardous.

In each of the graphs in FIGS. 9(*a*), 9(*b*), and 9(*c*) any given position on the line or curve is related to energy in the signal received by the receiver 38 at a specific frequency. The area under each curve is thus related to power. And it follows that the area under the curve is therefore related to something energetic, e.g., movement or noise. Object detection is concerned with the sensing of moving objects, (true positives) and ignoring other sources of energy (false positives) at the antenna 36 and the receiver 38 (see FIG. 2).

In the frequency domain of FIGS. 9(*a*)-9(*c*), movement tends to generate a curve of low height and thus covering a smaller area, whereas a false positive will tend to generate a plot of greater amplitude covering a larger area.

Noise is random and tends to cancel itself over time. If the energy—as represented by the area under the curve—is below a predetermined threshold, there is no detection. If the area under the curve is above the predetermined threshold, the detected activity is either identified as a real detection of a movement or as a false positive, i.e., not related to movement of a living or inanimate object in the field of view of the object detection apparatus.

Of course, where there is no reflection received by the object detection unit, the receiver will output a null signal which will result in a corresponding null in the frequency domain. The null may not be zero; there may be an element of noise, i.e., a noise floor.

Returning briefly to FIG. 2, the processor 40 processes the signal to determine the area in the frequency domain to distinguish between detected events and false positives. Identification of signals with handedness will cause the processor to output a signal (6) corresponding to a hazard condition. The ICS 10 is arranged to respond to the object detection apparatus 30 by stopping generation of the magnetic field or at least reducing the field to a safe level until the hazard is resolved.

Where there is substantial equality between left and right, as in the graph in FIG. 9(*a*), this is an indication that the signal may not be caused by an object and may be a false positive. When a false positive condition is detected, the processor 40 will output a signal indicating no object hazard. Plainly, where there is no hazard the ICS 10 will take no hazard-related action and will continue to generate the magnetic field 20 to transfer power and thus charge the battery 28 in the vehicle.

Figure 10:
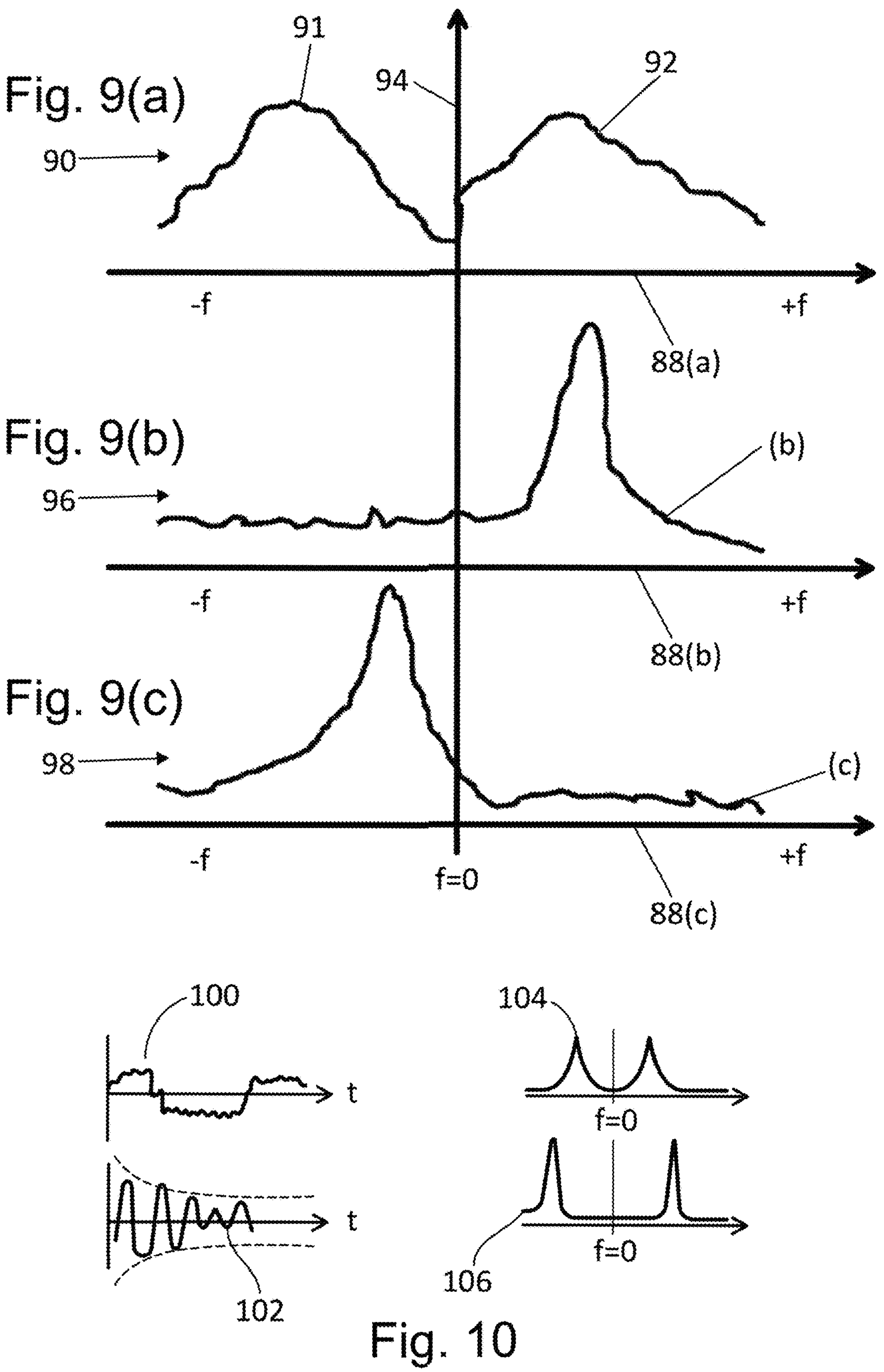
FIG. 10 shows time domain signals and their corresponding signals in the frequency domain.

Two time domain signals 100, 102 shown in FIG. 10 are converted by the processor 40 into equivalent signals 104, 106 in the frequency domain. This may be done using any of the well-known techniques for converting from a time domain to a frequency domain, e.g., a fast Fourier transform (FFT). In both cases the frequency domain signals have elements on both sides of a zero (f=0), as in FIG. 9(*c*). This is an indication of a false positive.

This approach of looking at received signal in the frequency domain also enables the detection of multiple objects. Plainly this is advantageous because it is possible that plural objects will move into the field of view of the receiver at essentially the same time. Moreover, in many situations, movement of multiple objects could relate to movement in the form of vibration of parts of the vehicle or of the ground over which the vehicle is parked. The ability to detect vibrations reduces the likelihood of false positives thereby improving confidence of the accuracy of the object detection apparatus.

Cars (and other vehicles) are essentially unitary structures. Parts of the car cannot move independently, other than under such limited circumstances as when they are vibrating. Vibration is caused by external stimuli, e.g., a heavy vehicle driving past the car being charged or something hitting the body of the car. Detection of vibration by the object detection apparatus 30 is therefore a false positive.

Vibration-related movement can be detected because objects set in motion in this way each have their own characteristic frequency and, thus, vibration will usually present a broad frequency spectrum. If different parts of the car are seen to be moving, the resulting signal most likely represents an activity related to vibration and not to an object entering the power transfer magnetic field.

Figure 11:
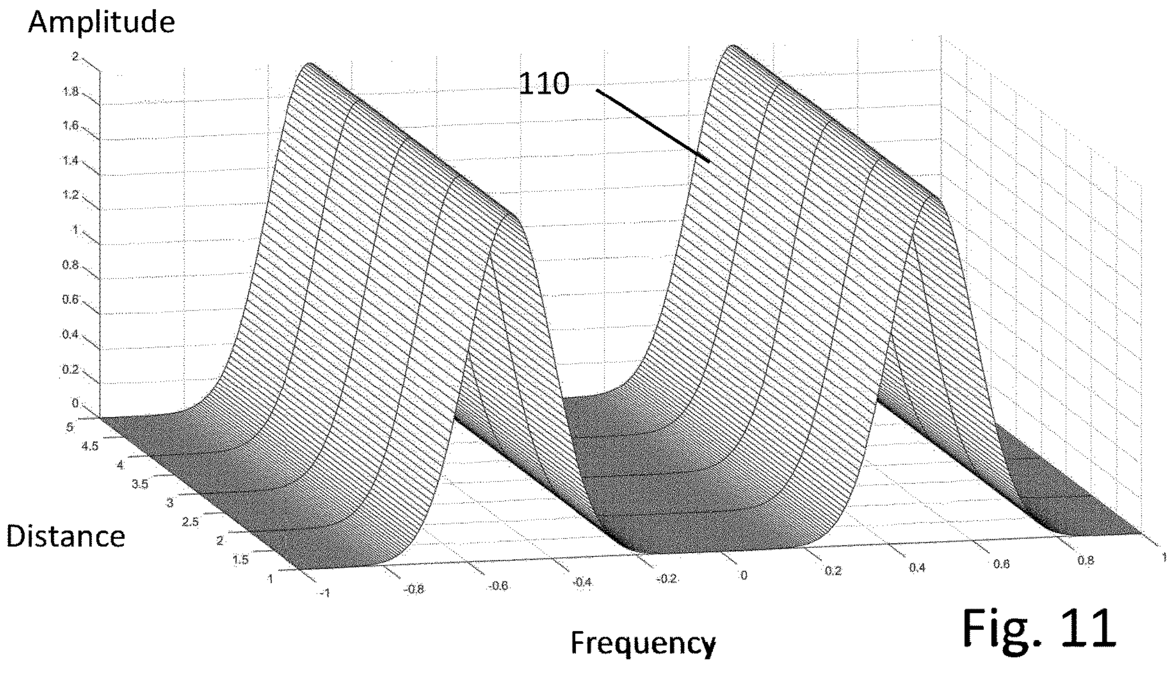
FIG. 11 shows a frequency domain signal having amplitude and distance components.

As shown in FIG. 11, a signal 110 represents both the amplitude of a movement and its distance. This signal 110 is obtained by processing the received signal using the processor 40 by way of an FFT or other well-known technique to produce a frequency domain equivalent signal. FIG. 11 is an example of a situation where the object detection apparatus 30 detects different parts underneath the vehicle, which parts are detected as moving at different speeds and in different directions, which are represented by positive and negative position values. This combination of frequency domain signals therefore represents a false positive. There is no safety risk and the WEVC system need not stop transferring energy via the magnetic field.

Figure 12:
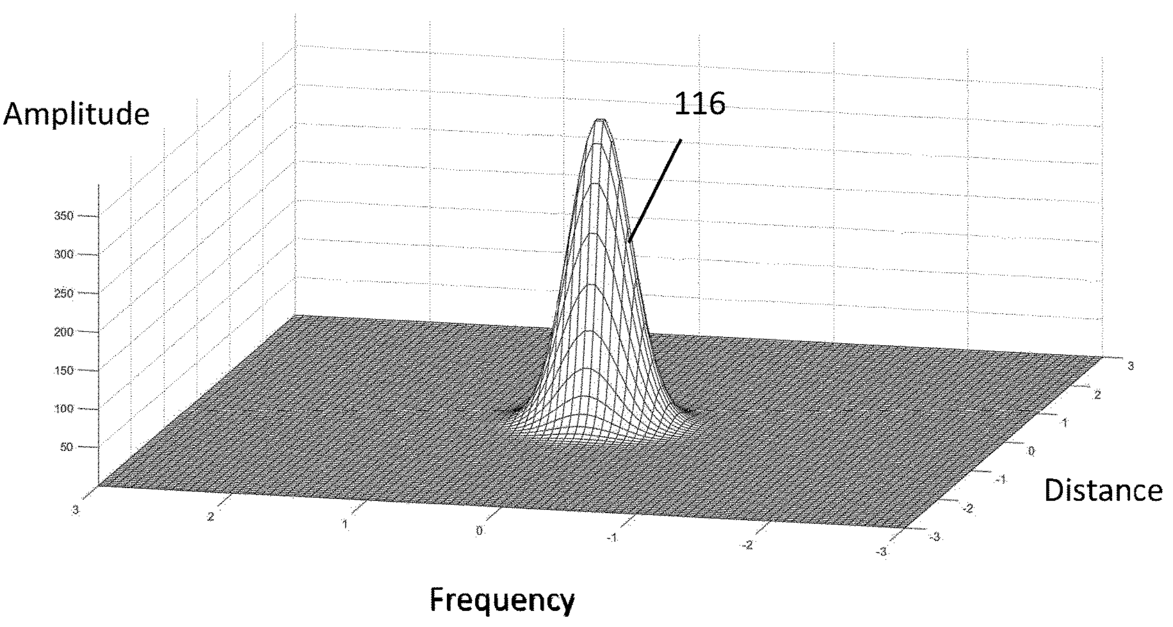
FIG. 12 shows a frequency domain signal corresponding to a hazard.

Another result of the FFT, as shown in FIG. 12, may be to produce a spike 116 corresponding to a single frequency or narrow band of frequencies, and a single or narrow range of distances. FIG. 12 represents a situation where an object, moving at a well-defined distance from the car pad module with a given speed can be identified, and therefore represents a potential hazard for the object in the magnetic field. The charging system 10 should be arranged to respond by shutting down or at least reducing the magnetic field 20 to a safe level.

When an inductive charging system is activated, there is an initial period where operating parameters change relatively quickly as currents flow through the coils, magnetic fields are formed and energy is delivered to the battery. After this initial transition, the ICS settles into a substantially steady state. 'Substantially' because as the battery charges the operating conditions will change. Put simply, the greater the charge in the battery, the greater the voltages and currents required to put further charge in the battery.

These operational changes are gradual and happen over minutes or hours. In contrast, hazardous events, such as a person putting their foot or hand under the car and into the magnetic field or a coin dropping onto the ground pad, happen suddenly. Vibration, on the other hand, is most likely a false positive that poses no problem. Vibration is not indicative of a hazardous situation and charging can start or continue uninterrupted.

When a passenger enters or leaves a vehicle there will be a sudden change in the position of the vehicle pad relative to the ground pad and, hence, the ground. When these external events happen, there is a sudden change in operation that may last only a few seconds. A change in relative position between the two pads has an immediate effect on the operating characteristics of the inductive charging system. Among other things voltages and current rise or fall and the transfer efficiency n changes. This change in operating characteristics is measurable.

Moreover, the way the transfer efficiency n change occurs is repeatable. If efficiency is represented as a line on a graph the shape of that line will be similar whenever, say, a person gets into the vehicle or an animal jumps onto the vehicle. Comparing a detected change with known changes in operating characteristics helps to reduce false positives, i.e., events that do not correspond to a hazardous situation. Thus, the processor 40, alone or in combination with other controlling circuitry (not shown) in the ICS 10, is able to moderate detection of an object depending on a change corresponding to such events as a change in height of a vehicle relative to the ground (a false positive) and to an object in or near the magnetic field (a true positive/event).

Having described the invention by reference to an object detection apparatus for an inductive charging system and by reference to an inductive charging system comprising an object detection apparatus, it is to be understood that the same have been described by way of example only and that modifications and variations such as will occur to those possessed of appropriate knowledge and skills may be made without departure from the spirit and scope of the invention as set forth in the appended claims and equivalents thereof.

The invention claimed is:

1. An inductive charging system comprising:

a ground pad module containing a coil and driving circuitry couplable with an electrical power supply configured to generate a magnetic field;

a car pad module containing a coil configured to receive energy from the magnetic field and driving circuitry couplable to deliver power to a battery in a vehicle; and an object detection apparatus comprising:

a transmitter configured to transmit a signal;

a receiver having a field of view including a substantial portion of the magnetic field, the receiver configured to receive within the field of view a reflected signal of the transmitted signal; and a signal processor configured to examine characteristics of the reflected signal as received by the receiver to identify a hazard condition in relation to the magnetic field; and a wireless data link between the ground pad module and the car pad module to transfer therebetween data relating to operation thereof, wherein the wireless data link comprises a first antenna associated with the ground pad module and a second antenna associated with the car pad module;

wherein the object detection apparatus is coupled to the first antenna associated with the ground pad module or the second antenna associated with the car pad module;

wherein the object detection apparatus is operable at a first frequency contemporaneously with the wireless data link operable at a second frequency different from the first frequency; and wherein the object detection apparatus and the wireless link are coupled to the first antenna of the ground pad module or the second antenna of the car pad module via respective filters respectively associated with the first frequency and the second frequency, wherein a first of the respective filters is configured to allow the reflected signal as received via the first frequency to pass to the object detection apparatus and to block a wireless signal associated with transfer of the data as received via the second frequency from passing to the object detection apparatus, while a second of the respective filters is configured to allow the wireless signal as received via the second frequency to pass to a communication element of the wireless data link and to block the reflected signal as received via the first frequency from passing to the communication element.

2. The system as claimed in claim 1, wherein the signal processor is operable to convert the reflected signal as received into an equivalent frequency domain signal, and further operable to examine the frequency domain signal to identify the hazard condition.

3. The system as claimed in claim 2, wherein the signal processor is operable to determine handedness of the frequency domain signal to identify the hazard condition.

4. The system as claimed in claim 3, wherein the signal processor is operable to determine position and/or direction of movement of an object in the magnetic field depending on the handedness of the frequency domain signal.

5. The system as claimed in claim 1, further comprising a reference store to hold data representing reference characteristics of a reference waveform, wherein the reflected signal as received comprises a waveform, wherein the signal processor is further configured to:

compare data representing characteristics of the waveform of the reflected signal as received with the reference characteristics of the reference waveform; and identify the hazard condition depending on equivalence between the waveform of the reflected signal as received and the reference waveform.

6. The system as claimed in claim 5, wherein the reference characteristics comprise characteristics of the signal transmitted by the transmitter.

7. The system as claimed in claim 5, wherein the reference characteristics comprise respective frequency and/or phase of the signal transmitted by the transmitter and the reflected signal as received by the receiver.

8. The system as claimed in claim 5, wherein the reference characteristics are related to operating characteristics associated with energy transfer via the magnetic field.

9. The system as claimed in claim 8, wherein the reference characteristics are associated with efficiency of the energy transfer.

10. The system as claimed in claim 5, wherein the reference characteristics are determined by voltage and/or current signals associated with transfer of the energy via the magnetic field.

11. The system as claimed in claim 1, wherein the signal processor is operable to moderate detection of an object depending on a change corresponding to a change in height of the vehicle relative to a ground.

12. The inductive charging system as claimed in claim 1, wherein:

the object detection apparatus is coupled to the first antenna of the car pad module; and the first antenna of the car pad module has the field of view that includes a volume of space between the ground pad module and the car pad module.

13. A method of detecting a hazard condition in an object detection apparatus of an inductive charging system in which energy is transferred via a magnetic field between a ground pad module and a car pad module in a vehicle, and in which data relating to operation of the ground pad module and the car pad module is transferred therebetween via a wireless data link between the ground pad module and the car pad module, the wireless data link comprising a first antenna associated with the ground pad module and a second antenna associated with the car pad module, the method comprising:

transferring the data via the wireless data link between the ground pad module and the car pad module, the wireless data link being operable at a first frequency;

transmitting a signal and receiving within a field of view including a substantial portion of the magnetic field, a reflected signal of the signal as transmitted via the object detection apparatus, the object detection apparatus being operable at a second frequency contemporaneously with the wireless data link being operable at the first frequency different from the second frequency, wherein the object detection apparatus and the wireless link are coupled to the first antenna of the ground pad module or the second antenna of the car pad module via respective filters respectively associated with the first frequency and the second frequency, wherein a first of the respective filters allows the reflected signal as received via the second frequency to pass to the object detection apparatus and blocks a wireless signal associated with transfer of the data as received via the first frequency from passing to the object detection apparatus, while a second of the respective filters allows the wireless signal as received via the first frequency to pass to a communication element of the wireless data link and blocks the reflected signal as received via the second frequency from passing to the communication element; and examining characteristics of the reflected signal as received to identify a hazard condition in relation to the magnetic field.

14. The method as claimed in claim 13, further comprising:

converting the reflected signal as received into an equivalent frequency domain signal; and examining the frequency domain signal to identify the hazard condition.

15. The method as claimed in claim 14, further comprising determining handedness of the frequency domain signal to identify the hazard condition.

16. The method as claimed in claim 15, further comprising determining position and/or direction of movement of an object in the magnetic field depending on the handedness of the frequency domain signal.

17. The method as claimed in claim 13, wherein the inductive charging system comprises a reference store holding data representing reference characteristics of a reference waveform, wherein the reflected signal as received comprises a waveform, wherein the method further comprises:

comparing data representing characteristics of the waveform of the reflected signal as received with the reference characteristics of the reference waveform; and identifying the hazard condition depending on equivalence between the waveform of the reflected signal as received and the reference waveform.

18. The method as claimed in claim 17, wherein the reference characteristics comprise characteristics of the signal as transmitted.

19. The method as claimed in claim 17, wherein the reference characteristics comprise respective frequency and/or phase of the signal as transmitted and the reflected signal as received.

20. The method as claimed in claim 17, wherein the reference characteristics are related to operating characteristics associated with energy transfer via the magnetic field.

21. The method as claimed in claim 20, wherein the reference characteristics are associated with efficiency of the energy transfer.

22. The method as claimed in claim 17, wherein the reference characteristics are determined by voltage and/or current signals associated with transfer of the energy via the magnetic field.

23. The method as claimed in claim 13, wherein the method further comprises moderating detection of an object depending on a change corresponding to a change in height of the vehicle relative to a ground.

24. The method as claimed in claim 13, wherein:

the object detection apparatus is coupled to the first antenna of the car pad module; and the first antenna of the car pad module has the field of view that includes a volume of space between the ground pad module and the car pad module.

* * * * *